K. T. TANAKA.
RAKE.
APPLICATION FILED MAR. 15, 1915.
1,149,098.
Patented Aug. 3, 1915.
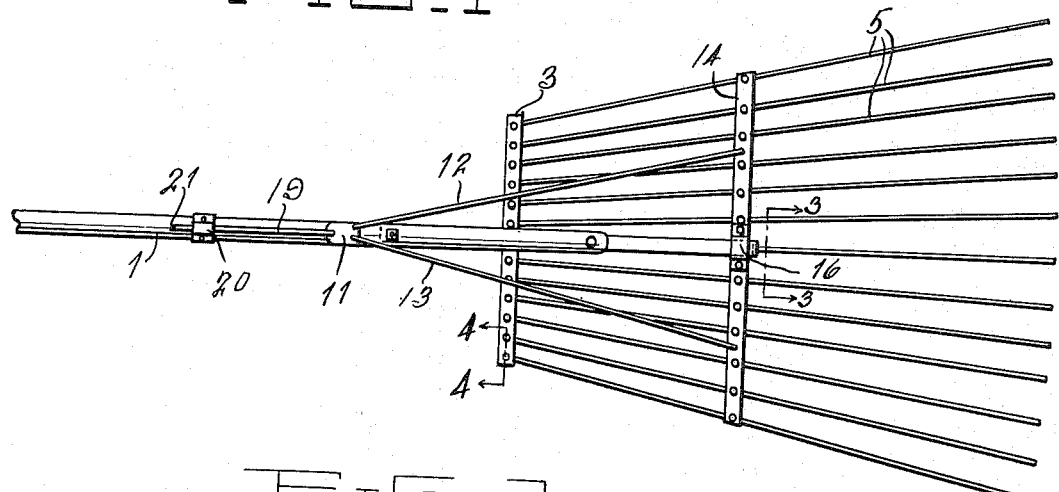
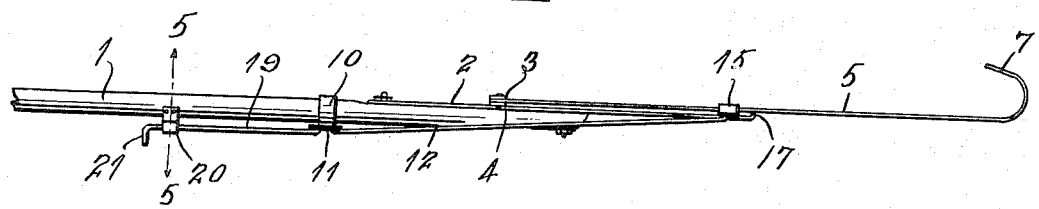
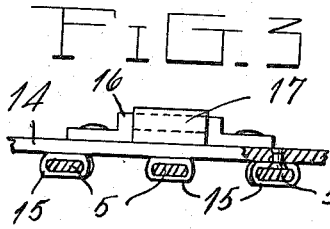
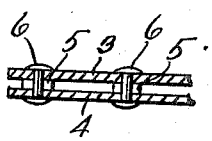
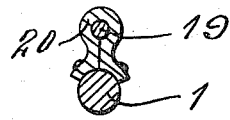
Inventor
K. T. Tanaka
Witnesses
Chas. H. Trotter.
R. R. Meyer.

UNITED STATES PATENT OFFICE.

KAY T. TANAKA, OF SALT LAKE CITY, UTAH.

RAKE.

1,149,098.   Specification of Letters Patent.   Patented Aug. 3, 1915.

Application filed March 15, 1915. Serial No. 14,481.

*To all whom it may concern:*

Be it known that I, KAY T. TANAKA, a subject of the Emperor of Japan, residing at Salt Lake City, in the county of Salt Lake and State of Utah, have invented certain new and useful Improvements in Rakes; and I do hereby declare the following to be a full, clear, and exact description of the invention, such as will enable others skilled in the art to which it appertains to make and use the same.

This invention relates to lawn rakes, and the primary object of the invention is to provide a lawn rake embodying a plurality of pivotally supported resilient rake teeth which are positioned substantially in a horizontal plane and have their outer ends curved for forming obstacle engaging sections, for engaging and raking leaves, sticks, grass or the like.

Another object of this invention is to provide means for synchronously moving said pivotally supported resilient raking teeth for varying the raking scope of the rake.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a top plan view of the improved rake, Fig. 2 is a side elevation of the rake, Fig. 3 is a cross section on the line 3—3 of Fig. 1, Fig. 4 is a section on the line 4—4 of Fig. 1, and Fig. 5 is a section on line 5—5 of Fig. 2.

Referring more particularly to the drawings, 1 designates the handle of the rake which has an arm 2 secured to the under surface of its outer end and projecting longitudinally from the end of the rake handle. The plate or arm 2 has a pair of spaced transversely extending plates 3 and 4 secured thereto, inwardly of the end of the handle 1, between which plates are pivotally mounted the resilient teeth 5 of the rake. The resilient teeth 5 are pivotally connected to the plates 3 and 4 by means of rivets or analogous fastening devices indicated at 6, and they extend outwardly therefrom, in the same plane with the handle 1 of the plate or arm 2. The resilient rake teeth 5 have their outer ends 7 curved downwardly and forming article engaging tines for engaging leaves, grass or the like to be raked from a lawn or other surface.

The handle 1 has metallic rings 10 slidably mounted thereon, to which is attached a plate 11. The plate 11 has rods 12 and 13 pivotally connected thereto, which rods extend outwardly over the pivoted ends of the rake teeth 5, and are pivotally connected to a bar 14, which extends across the upper surfaces of the rake teeth and parallel with the plates 3 and 4. The plate 14 has a plurality of sockets or rings 15 secured to its under surface which are slidably mounted upon the rake teeth 5. The plate 14 further has a strap 16 secured to the upper surfaces thereof substantially equi-distant of its ends, which form a socket for slidably receiving the plate or arm 2, which arm forms a guide for guiding the movement of the plate 14. The outer end of the plate or arm 2 is provided with a transversely extending projection 17 which limits the outward movement of the plate or bar 14.

A rod 19 is connected to the plate 11 and extends longitudinally along the handle 1, being slidably seated in a guide 20, which is carried by the handle. The rod 19 has its outer end bent to form a hand grip 21 by means of which the rod is moved longitudinally, for sliding the rings 10 upon the handle 1. The sliding of the rings 10, will move the rake teeth 5 upon their pivotal connection with the plates 3 and 4, for spacing the outer curved ends of the rake teeth at increased or decreased distances from each other, for regulating the raking scope of the rake. By moving the rings 10 downwardly toward the plates 3 and 4, the bar 14 will be moved outwardly along the bar or plate 2, which will move the teeth nearer each other, decreasing the raking scope of the rake and permitting of the raking of fine or small articles. When it is desired to rake comparatively large articles, the ring 10 is moved by means of longitudinal movement of the rod 19, upwardly toward the end of the handle 1, upon the plate 2, which forces the rake teeth farther apart, increasing the raking scope of the rake in accordance with the distance which the plate is moved.

The resiliency of the teeth 5, which teeth are relatively long, will permit the teeth to spring upwardly, independently of each other, or in unison with each other, for permitting the rake to pass over knolls, or other obstructions in the surface which is being raked over.

In reducing the invention to practice, certain minor features of construction, combination and arrangement of parts may necessitate alteration, to which the patentee is entitled, provided such alterations are comprehended within the scope of what is claimed.

What is claimed is:—

1. In a rake, a handle, a pair of transversely extending plates carried by said handle, a longitudinally extending plate carried by said handle and projecting outwardly from the lower end of said handle, a plurality of substantially horizontally disposed rake teeth pivotally carried by said first named plates, and means carried by said handle and guided by said second named plate for regulating the pivotal movement of said teeth for increasing or decreasing the raking scope of said rake.

2. In a rake, a handle, a plate carried by said handle and extending longitudinally therefrom, a pair of transversely extending plates carried by said handle, a plurality of relatively long substantially horizontally positioned resilient rake teeth pivotally carried by said transversely extending plates, said rake teeth having their outer ends curved downwardly and forwardly, a bar slidably carried by said longitudinally extending plate, a plurality of sockets mounted upon the under surface of said bar and slidably mounted upon said rake teeth, and means for moving said bar along said longitudinally extending plate thus moving said rake teeth upon their pivotal connection.

In testimony whereof I affix my signature in presence of two witnesses.

KAY T. TANAKA.

Witnesses:
H. A. DAHLSRUD,
ORIN A. OGILVIE.